US012334291B2

(12) United States Patent
Akiyama et al.

(10) Patent No.: US 12,334,291 B2
(45) Date of Patent: Jun. 17, 2025

(54) FUSE

(71) Applicants: TOYOTA JIDOSHA KABUSHIKI KAISHA, Toyota (JP); PACIFIC ENGINEERING CORP., Ogaki (JP)

(72) Inventors: Kiyokazu Akiyama, Okazaki (JP); Katsumi Yuasa, Nishio (JP); Ryohei Ono, Anjo (JP); Kenji Osada, Echi-gun (JP); Syuya Kataoka, Nordrhein-westfalen (DE)

(73) Assignees: TOYOTA JIDOSHA KABUSHIKI KAISHA, Toyota (JP); PACIFIC ENGINEERING CORP., Ogaki (JP)

( * ) Notice: Subject to any disclaimer, the term of this patent is extended or adjusted under 35 U.S.C. 154(b) by 100 days.

(21) Appl. No.: 18/349,599

(22) Filed: Jul. 10, 2023

(65) Prior Publication Data

US 2024/0029988 A1 Jan. 25, 2024

(30) Foreign Application Priority Data

Jul. 19, 2022 (JP) ................................ 2022-114958

(51) Int. Cl.
*H01H 85/10* (2006.01)
*H01H 85/175* (2006.01)

(52) U.S. Cl.
CPC .......... *H01H 85/10* (2013.01); *H01H 85/175* (2013.01)

(58) Field of Classification Search
CPC ...................... H01H 85/08–12; H01H 85/175
See application file for complete search history.

(56) References Cited

U.S. PATENT DOCUMENTS

| | | | | |
|---|---|---|---|---|
| 3,147,355 A * | 9/1964 | Beau | H01H 85/10 337/229 |
| 3,256,409 A * | 6/1966 | Brandt | H01H 85/10 337/276 |
| 3,374,328 A * | 3/1968 | Cameron | H01H 85/10 337/229 |
| 4,893,106 A | 1/1990 | Goldstein et al. | |
| 2015/0348732 A1* | 12/2015 | Douglass | H01H 85/175 337/198 |
| 2015/0371803 A1 | 12/2015 | Hosomizo et al. | |
| 2021/0407757 A1 | 12/2021 | Osada | |

FOREIGN PATENT DOCUMENTS

| | | |
|---|---|---|
| JP | H02-10623 A | 1/1990 |
| JP | 2014-154234 A | 8/2014 |
| JP | 2016-085939 A | 5/2016 |
| JP | 2020-107538 A | 7/2020 |
| JP | 2022-019113 A | 1/2022 |

* cited by examiner

*Primary Examiner* — Jacob R Crum
(74) *Attorney, Agent, or Firm* — Oliff PLC

(57) ABSTRACT

A fuse includes: an element including a plurality of narrow portions each of which becomes a starting point of fusion cutting; a pair of terminals connected by the element; and a case housing the element, in which the element has a curved surface, and is disposed in a tube shape.

5 Claims, 6 Drawing Sheets

FUSE

CROSS-REFERENCE TO RELATED APPLICATION

This application claims priority to Japanese Patent Application No. 2022-114958 filed on Jul. 19, 2022, incorporated herein by reference in its entirety.

BACKGROUND

1. Technical Field

The present disclosure relates to a fuse.

2. Description of Related Art

In recent years, with capacity increase and voltage increase in a battery for a battery electric vehicle (BEV), a plug-in hybrid electric vehicle (PHEV) or the like, the short-circuit current at the time of failure also tends to increase. For example, in a high-capacity fuse for the BEV, the rated current is several hundred amperes, and therefore a plurality of plate-shaped elements among which distances are secured is needed, leading to size increase and cost rise.

For example, Japanese Unexamined Patent Application Publication No. 2020-107538 discloses a structure of a fuse that deals with large current by disposing a plurality of elements each of which a single metal plate is bent in a L-shape, in the interior of a case having a circular tube shape, and that is easily produced.

SUMMARY

In the technology disposed in JP 2020-107538 A, at the time of high-voltage break, the energy of an arc that is generated at the time of fusion cutting is large, and therefore a case (material and size) that can withstand the rise in internal pressure due to the melting and vaporization of the element made of copper is needed. Therefore, physical size and production cost increase.

The present disclosure has been made in view of the above problem, and has an object to provide a fuse that makes it possible to realize size reduction and cost reduction.

A fuse according to the present disclosure includes: an element including a plurality of narrow portions each of which becomes a starting point of fusion cutting; a pair of terminals connected by the element; and a case housing the element, in which the element has a curved surface, and is disposed in a tube shape.

With the present disclosure, it is possible to promote arc extinction by dispersing and reducing the arc, and to restrain pressure rise, and therefore it is possible to realize size reduction and cost reduction.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A fuse according to an embodiment of the present disclosure will be described with reference to the drawings. Constituent elements in the following embodiments include constituent elements that can be substituted and easily by a person skilled in the art, or substantially identical constituent elements.

Recently, in a battery system for a BEV or a PHEV, the capacity and the voltage has increased, and for example, when battery short-circuit occurs due to accident or failure, a short-circuit current of more than ten thousand amperes flows in some cases. An element in the interior of a fuse is molten by the Joule heat due to the short-circuit current, so that the current path is broken. The interior of the fuse is filled with arc-extinguishing sand, which has an effect of promoting the extinction of an arc generated at the time of the melting of the element.

With the increase in the above short-circuit current, the arc at the time of the melting becomes large. Therefore, there is a problem of the increase in the physical size of the fuse and the increase in the cost of a case material for dealing with the heat of the arc and the pressure rise. For example, when the case of the fuse is changed from a resin case to a ceramic case, the cost increases significantly. Hence, the present disclosure promotes the arc extinction by dispersing and reducing the arc, restrains the pressure rise, and thereby realizes size reduction and cost reduction.

Generally, in a fuse for large electric current, a plate-shaped element is used, and for regulating the fusion cutting property, the element is provided with a narrow portion in which the current path is thin and on which electric current is concentrated. At the time of fusion cutting, the arc is generated while the narrow portion becomes a starting point.

Further, due to the heat of the arc, not only the element but also some of the peripheral arc-extinguishing sand melt and vaporize.

A major factor for the pressure rise in the interior of the fuse is the vaporization of the element, and the pressure rise can be restrained by promoting the extinction of the arc. Hence, the arc extinction is promoted by dispersing the arc and increasing the contact with the arc-extinguishing sand. On this occasion, when a plurality of arcs joins and becomes a large arc, the arc extinction is not promoted. Therefore, it is important to dispose narrow portions such that arcs do not join. Generally, the case of the fuse has a circular tube shape or an elliptic tube shape, in consideration of pressure resistance. In the present disclosure, plate-shaped elements having curved surfaces are provided in a tube shape, and thereby many narrow portions are disposed, so as to keep distance from each other in the internal space.

Figure 1:
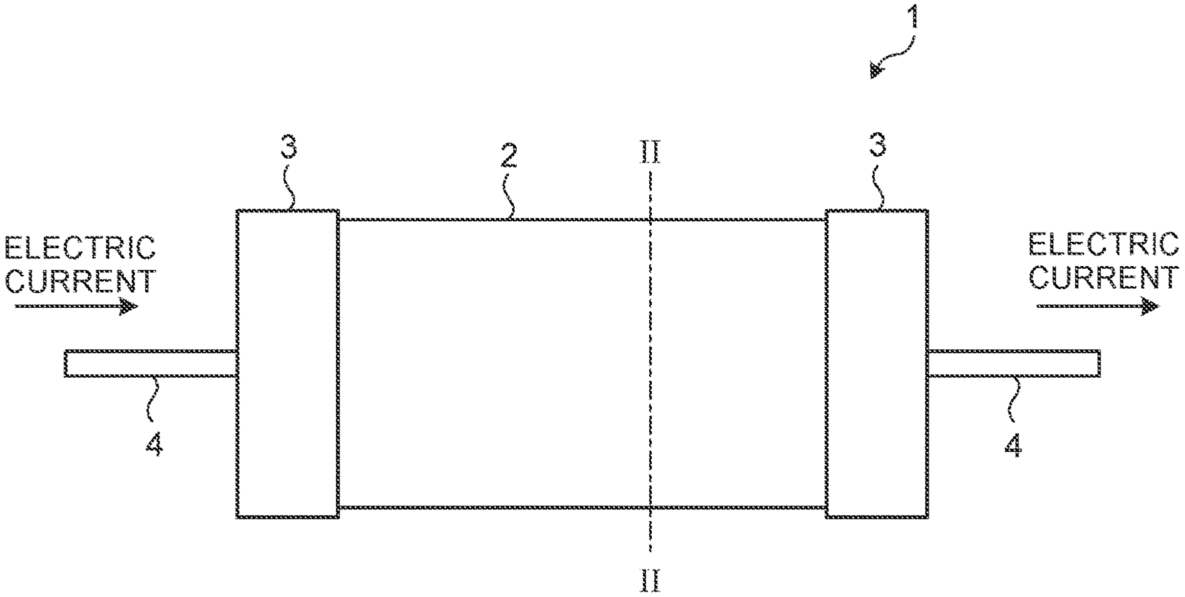
FIG. 1 is an elevational view showing a schematic configuration of a fuse according to an embodiment.
Figure 2:
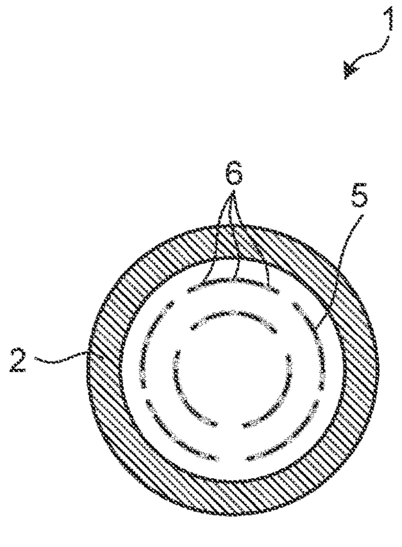
FIG. 2 is a sectional view of the fuse according to the embodiment taken along line II-II in FIG. 1.
Figure 3:
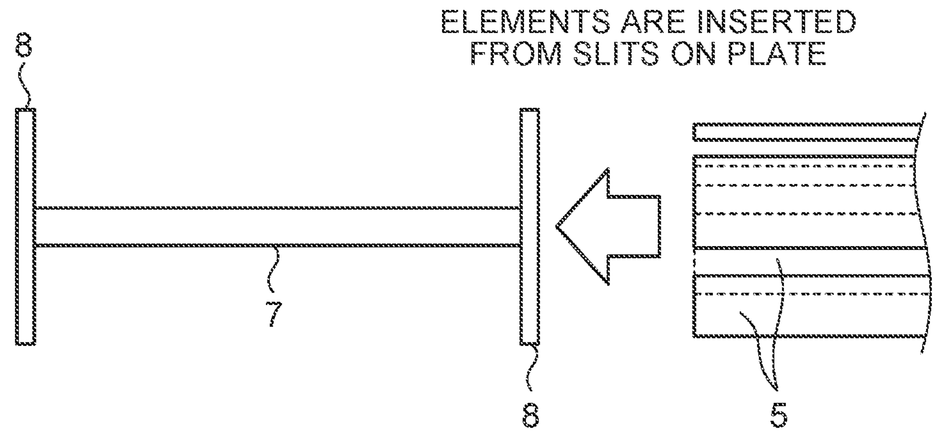
FIG. 3 is a diagram showing a manner in which elements are installed between a pair of plates in the fuse according to the embodiment.

A specific configuration of the fuse according to the embodiment will be described with reference to FIG. 1 to FIG. 11. As shown in FIG. 1 to FIG. 3, a fuse 1 includes a case 2, caps 3, a pair of terminals 4, elements 5, and a pair of plates 8.

The case 2 houses a plurality of elements, and others. The case 2 is made of resin, for example, and is formed in a circular tube shape or an elliptic tube shape. Further, the interior of the case 2 is filled with arc-extinguishing sand for promoting the arc extinction.

The caps 3 are attached to both sides (both end portions) of the case 2. The pair of terminals 4 are connected by elements 5 in the interior of the case 2.

The elements 5 melt and break the current path, for example, when the battery short-circuit occurs due to accident or failure. The elements 5 are made of copper, for example, and are constituted by a plurality of elements each of which has a partial shape of a circular tube shape or an elliptic tube shape. Further, each element 5 includes a plurality of narrow portions 6. The narrow portion 6 is a portion (see FIG. 10 described later, for example) at which the width is narrower than the other portion in the element 5, and becomes a starting point at the time of the fusion cutting.

In an example shown in FIG. 2, the elements 5 having curved surfaces (formed in a curved surface shape) are disposed so as to have a tube shape and to be doubly lapped, and thereby 24 narrow portions 6 are disposed on an identical cross-section. Each element 5 includes an equal number of narrow portions 6 (three narrow portions 6 in FIG. 2). By equalizing the number of the narrow portions 6 of each element 5 and uniforming conductor resistance in this way, the electric current at normal time and at the time of short-circuit current carrying is not biased, and therefore the heat generation at normal time and the break property at the time of the short circuit become stable. As long as these conditions are met, the number of elements 5 and the number of narrow portions 6 are not limited to the configuration in FIG. 2.

The plates 8 (see FIG. 3 and FIG. 4) made of metal are fixed to both ends of the elements 5, for example, by welding, electrically conductive adhesion or the like. In a state where the plurality of elements 5 is fixed to the pair of plates 8, the plurality of elements 5 is inserted into the case 2, and then, the case 2 is filled with the arc-extinguishing sand. Thereafter, from the outsides of the pair of plates 8, the pair of caps 3 and the pair of terminals 4 are connected by pressure bonding.

When the elements 5 are installed between the plates 8, it is necessary to fix the elements 5 such that the positions of the plates 8 are not displaced. Therefore, when the elements 5 are installed between the plates 8, for example, as shown in FIG. 3, the centers of the two plates 8 are fixed by a temporary fixation shaft 7. Then, the elements 5 are inserted from slits 9 (see FIG. 4) formed on the plates 8.

Figure 4:
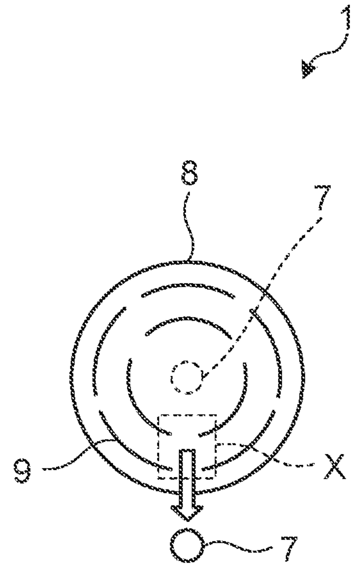
FIG. 4 is a diagram of a plate in FIG. 3 in the fuse according to the embodiment, as viewed from a side surface of the plate, and shows a manner in which a temporary fixation shaft is drawn out from gaps among elements after the elements are installed between the plates.
Figure 5:
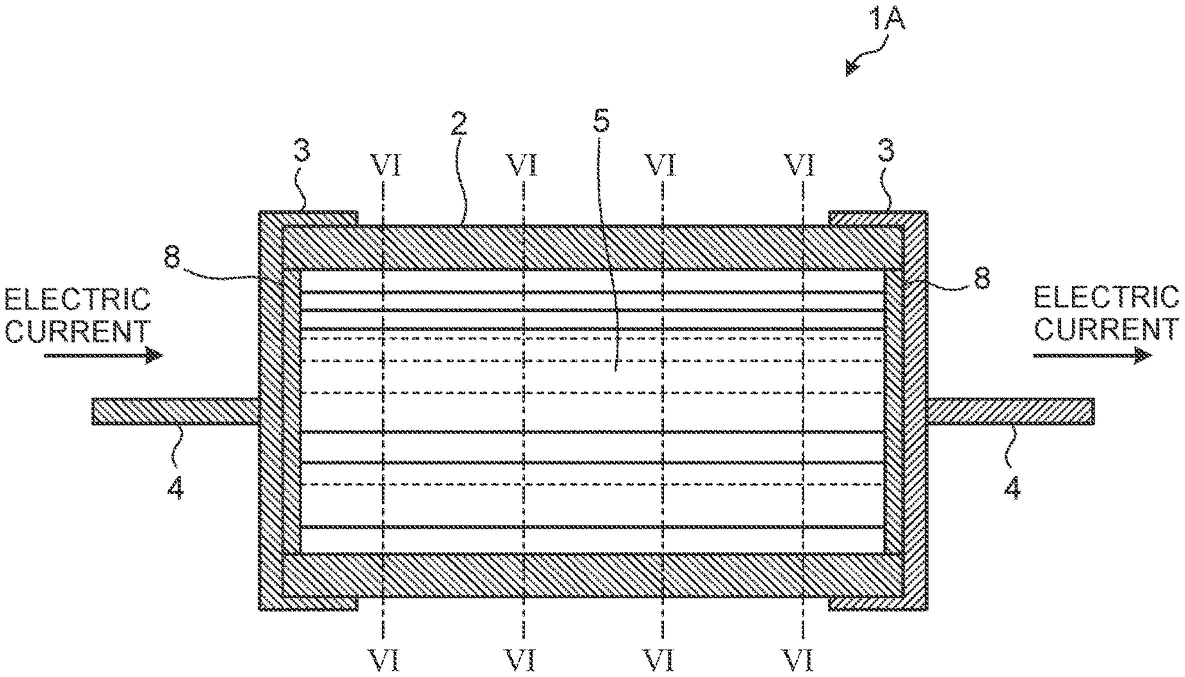
FIG. 5 is a sectional view showing an example of a case where the elements are disposed such that planes on which narrow portions are provided are aligned for each element in the fuse according to the embodiment.
Figure 6:
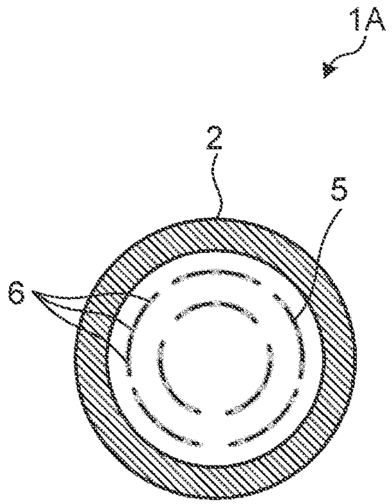
FIG. 6 is a sectional view of the fuse according to the embodiment taken along line VI-VI in FIG. 5.

For example, as shown in FIG. 4, the elements 5 are disposed in a shape in which a plurality of tubes different in diameter is lapped. Further, as shown in part X in FIG. 4, the elements 5 are disposed such that gaps among elements 5 are aligned at least in one direction across the plurality of tubes. By aligning both gaps on the inner side and outer side of the elements 5 having a tube shape in the same direction in this way, it is possible to draw out the temporary fixation shaft 7 from the above gaps, after the elements 5 are fixed to the plates 8.

As a method for securing the distance between narrow portions 6, planes on which the narrow portions 6 are disposed may be alternated. For example, in a fuse 1A shown in FIG. 5 and FIG. 6, similarly to the fuse 1 in FIG. 1, 24 narrow portions 6 are disposed on an identical cross-section, and four cross-sections on each of which the 24 narrow portions 6 are disposed are included in the longitudinal direction of the fuse 1A. That is, in the fuse 1A, planes on which the narrow portions 6 are provided are disposed so as to be aligned for each element 5.

Figure 7:
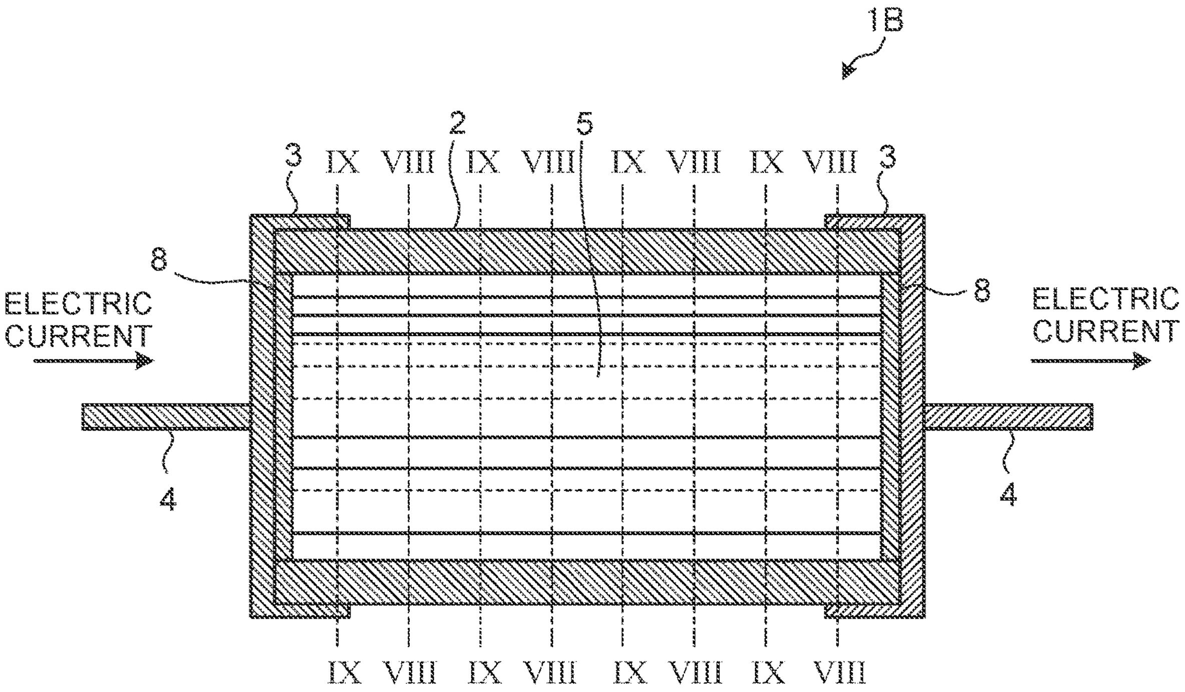
FIG. 7 is a sectional view showing an example of a configuration in which planes on which narrow portions are provided are shifted for each element in the fuse according to the embodiment.
Figure 8:
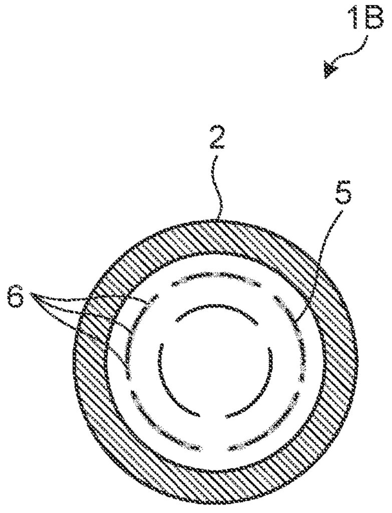
FIG. 8 is a sectional view of the fuse according to the embodiment taken along line VIII-VIII in FIG. 7.
Figure 9:
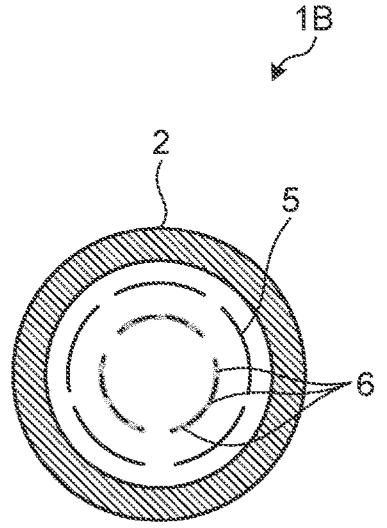
FIG. 9 is a sectional view of the fuse according to the embodiment taken along line IX-IX in FIG. 7.

In contrast, for example, as in the case of a fuse 1B shown in FIG. 7 to FIG. 9, planes on which the narrow portions 6 are provided may be disposed so as to be shifted for each element 5. That is, the narrow portions 6 may be divided and may be alternately disposed on separate cross-sections. Thereby, it is possible to secure the distance between narrow portions 6. Further, in the fuse 1B, it is possible to reduce the whole size by decreasing the distance among the provided cross-sections, or it is possible to increase the upper limit of the short-circuit current.

In FIG. 7 to FIG. 9, the narrow portions 6 are divided by the inner elements 5 and the outer elements 5 in the tube shape, but a dividing way other than the dividing way in FIG. 7 to FIG. 9 may be adopted as long as the distance can be secured without changing the number of the narrow portions 6 for each element 5.

Figure 10:
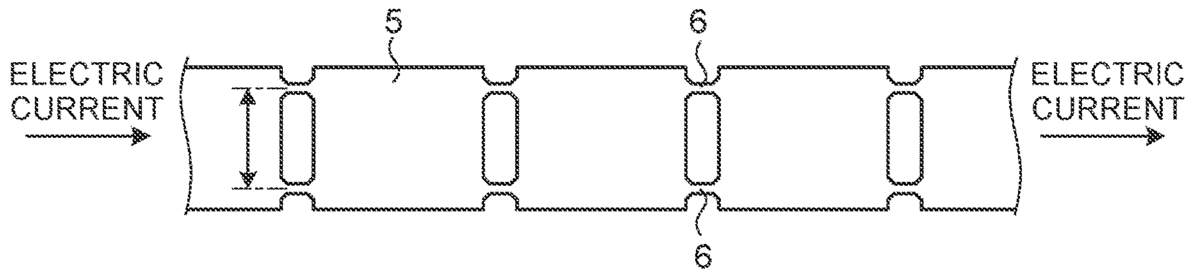
FIG. 10 is a diagram showing an example of a case where provided positions of a plurality of narrow portions in an element are aligned in the fuse according to the embodiment.
Figure 11:
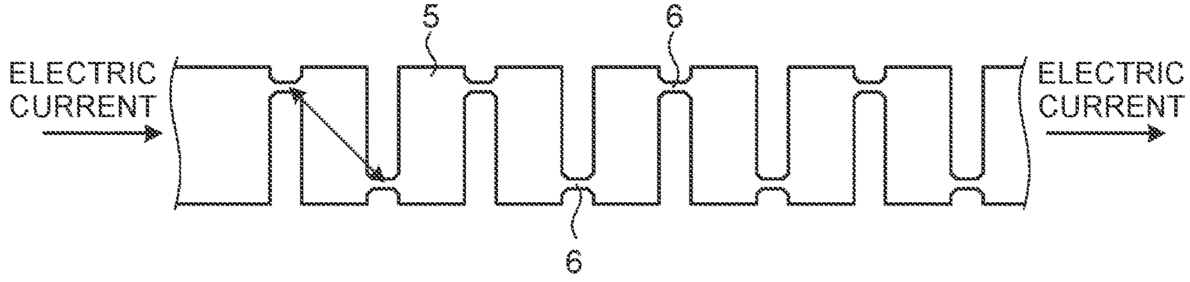
FIG. 11 is a diagram showing an example of a case where provided positions of a plurality of narrow portions in an element are alternated in the fuse according to the embodiment.

In addition to the alternation of the provided cross-sections among the elements 5, for example, for the plurality of narrow portions 6 in the element 5 shown in FIG. 10, the distance between narrow portions 6 may be secured by alternating the provided positions in the element 5, for example, as shown in FIG. 11.

In the fuse according to the above-described embodiment, it is possible to promote the arc extinction by dispersing and reducing the arc, and to restrain the pressure rise, and therefore it is possible to realize size reduction and cost reduction.

Further, in the fuse according to the embodiment, for example, as shown in FIG. 2, the elements 5 having curved surfaces are disposed in a tube shape. By increasing the number of narrow portions 6 each of which becomes the starting point of the arc in this way, it is possible to divide the arc and to enhance the arc extinction performance. Further, by disposing the elements 5 in a tube shape, it is possible to maximally increase the number of narrow portions 6 while keeping such a distance that arcs are not joined in the interior of the case 2 having a circular tube shape or an elliptic tube shape.

Further, in the fuse according to the embodiment, for example, as shown in FIG. 2, the elements 5 are constituted by a plurality of elements each of which has a partial shape of a circular tube shape or an elliptic tube shape, and each element 5 includes an equal number of narrow portions 6 (three narrow portions 6 in FIG. 2). In the case where the elements 5 are constituted by a plurality of elements in this way, by equalizing the number of narrow portions 6, it is possible to avoid electric current from being biased, and to stabilize the heat generation at normal time and the property at the time of break.

Further, in the fuse according to the embodiment, for example, as shown in FIG. 2, the elements 5 are disposed in a shape in which a plurality of tubes different in diameter is lapped. By disposing the elements 5 having a tube shape doubly or triply in the radial direction in this way, it is possible to further increase the number of narrow portions 6.

Further, in the fuse according to the embodiment, for example, as shown in FIG. 4, the elements 5 are disposed such that gaps among elements 5 are aligned at least in one direction across the plurality of tubes. Thereby, it is possible to draw out the temporary fixation shaft 7 used at the time of the installation, from the gaps, after the elements 5 are fixed. Accordingly, it is possible to enhance workability at the time of the installation of the fuse 1.

Further, in the fuse according to the embodiment, for example, as shown in FIG. 7 to FIG. 9, the elements 5 may be disposed such that planes on which the narrow portions 6 are provided are shifted for each element. Thereby, it is possible to secure the distance between narrow portions 6, and to restrain the joining of arcs.

A person skilled in the art can easily derive additional effects and modifications. Consequently, wider aspects of the present disclosure are not limited to specific details and representative embodiments shown and described above. Accordingly, various alterations can be made without departing from the spirit or scope of the broad concept of the disclosure that is defined by the accompanying claims and equivalents of the claims.

What is claimed is:

1. A fuse comprising:

an element in a tube shape, the element including a plurality of narrow portions each of which becomes a starting point of fusion cutting;

a pair of terminals connected by the element; and a case housing the element, wherein the element is constituted by a plurality of elements each of which connecting the pair of terminals, the plurality of elements being separate from each other in a circumferential direction of the tube shape by a gap that extends between the pair of terminals, each of the plurality of elements being curved into an arc, collectively the plurality of elements form a circular tube shape or an elliptic tube shape, and each of the plurality of elements includes an equal number of the narrow portions.

2. The fuse according to claim 1, wherein the element is disposed in a shape in which a plurality of concentric tubes different in diameter from each other is lapped.

3. The fuse according to claim 1, wherein the element is disposed such that the gaps among elements are aligned in a radial direction of the tube shape, in at least in one direction across a plurality of concentric tubes.

4. The fuse according to claim 1, wherein the element is disposed such that planes on which the narrow portions are provided are shifted for each element.

5. The fuse according to claim 1, further comprising a plate fixed to each end of the element, wherein the plates include slits configured for the element to pass through.

* * * * *